US012374818B2

(12) United States Patent
Garcia-Ferre et al.

(10) Patent No.: US 12,374,818 B2
(45) Date of Patent: Jul. 29, 2025

(54) CONTACT ELEMENT ARRANGEMENT FOR AN EV CONNECTOR

(71) Applicant: ABB Schweiz AG, Baden (CH)

(72) Inventors: Francisco Garcia-Ferre, Baden (CH); Lilian Kaufmann, Birmenstorf (CH); Pedram Kheiri, Hausen (CH); Wiebe Zoon, Delft (NL); Stefan Raaijmakers, Delft (NL)

(73) Assignee: ABB Schweiz AG, Baden (CH)

( * ) Notice: Subject to any disclaimer, the term of this patent is extended or adjusted under 35 U.S.C. 154(b) by 352 days.

(21) Appl. No.: 17/948,631

(22) Filed: Sep. 20, 2022

(65) Prior Publication Data
US 2023/0092835 A1 Mar. 23, 2023

(30) Foreign Application Priority Data

Sep. 21, 2021 (EP) .................................... 21197988

(51) Int. Cl.
*H01R 13/04* (2006.01)
*B60L 53/16* (2019.01)
*B60L 53/302* (2019.01)
*F25B 41/40* (2021.01)

(52) U.S. Cl.
CPC .............. *H01R 13/04* (2013.01); *B60L 53/16* (2019.02); *B60L 53/302* (2019.02); *F25B 41/40* (2021.01); *H01R 2201/26* (2013.01)

(58) Field of Classification Search
CPC ......... F25B 41/40; H01R 13/04; H01R 13/28; B60L 53/16; B60L 53/18; B60L 53/302
USPC .................................................. 439/485, 196
See application file for complete search history.

(56) References Cited

U.S. PATENT DOCUMENTS

| | | | |
|---|---|---|---|
| 8,339,773 B2 * | 12/2012 | Frassineti | H01H 1/58 361/677 |
| 10,029,575 B2 | 7/2018 | Remisch | |
| 10,081,262 B2 | 9/2018 | Nagel et al. | |
| 10,109,395 B2 | 10/2018 | Beimdieck et al. | |
| 10,634,434 B2 * | 4/2020 | Laurila | F28D 15/0275 |
| 10,644,422 B2 * | 5/2020 | Moseke | B60L 53/302 |
| 10,675,988 B2 * | 6/2020 | Fuehrer | B60L 53/16 |
| 10,902,977 B2 * | 1/2021 | Cantz | H01R 13/506 |

(Continued)

FOREIGN PATENT DOCUMENTS

DE 102011100389 A1 5/2012
DE 102016206300 A1 10/2017

(Continued)

OTHER PUBLICATIONS

EP3401955 original w/translation (Year: 2018).*

(Continued)

*Primary Examiner* — Marcus E Harcum
(74) *Attorney, Agent, or Firm* — McCarter & English, LLP

(57) ABSTRACT

A contact element arrangement for an electric vehicle (EV) connector configured to connect a charging wire to a connector interface on vehicle-side includes a contact element and a heat pipe. The contact element comprises a base portion to which a charging wire is connected and a contact portion, which is adapted to contact a counter contact element on a vehicle side. The base portion is cooled by a fluid, and the heat pipe extends from the contact portion to the base portion and is configured to carry heat from the contact portion to the base portion.

13 Claims, 3 Drawing Sheets

(56) References Cited

U.S. PATENT DOCUMENTS

| | | |
|---|---|---|
| 11,469,531 B2 * | 10/2022 | Cole .................. B60L 53/11 |
| 2018/0264957 A1 | 9/2018 | Fuehrer et al. |
| 2019/0074620 A1 * | 3/2019 | Moseke ............... B60L 53/16 |
| 2019/0074628 A1 | 3/2019 | Fuehrer |
| 2019/0109409 A1 | 4/2019 | Fuehrer et al. |
| 2019/0252095 A1 * | 8/2019 | Mayer ................ B60L 53/302 |
| 2019/0315239 A1 | 10/2019 | Beimdieck et al. |
| 2019/0322186 A1 | 10/2019 | Arai |
| 2019/0344674 A1 | 11/2019 | Arai |
| 2021/0358657 A1 * | 11/2021 | Shabgard ............. B60L 53/18 |
| 2022/0410744 A1 * | 12/2022 | Choi .................. B60L 53/18 |

FOREIGN PATENT DOCUMENTS

| | | |
|---|---|---|
| DE | 102016117011 A1 | 3/2018 |
| EP | 3770005 A1 | 1/2021 |
| EP | 3770007 A1 | 1/2021 |
| JP | 2012-238532 A | 12/2012 |
| WO | WO 2017/133893 A1 | 8/2017 |
| WO | WO 2017/143295 A1 | 8/2017 |
| WO | WO 2017/162464 A1 | 9/2017 |
| WO | WO 2017/162494 A1 | 9/2017 |
| WO | WO 2017/162532 A1 | 9/2017 |
| WO | WO 2017/162651 A1 | 9/2017 |
| WO | WO 2018/006903 A1 | 1/2018 |
| WO | WO 2018/050724 A1 | 3/2018 |
| WO | WO 2018/060151 A1 | 4/2018 |
| WO | WO 2018/192805 A1 | 10/2018 |
| WO | WO 2019/008047 A1 | 1/2019 |
| WO | WO 2020/150105 A1 | 7/2020 |
| WO | WO 2021/107502 A1 | 6/2021 |

OTHER PUBLICATIONS

European Patent Office, Extended European Search Report in European Patent Application No. 21197988.5, 10 pp. (Feb. 25, 2022).

* cited by examiner

CONTACT ELEMENT ARRANGEMENT FOR AN EV CONNECTOR

CROSS-REFERENCE TO RELATED APPLICATIONS

This patent application claims priority to European Application No. 21197988.5, filed on Sep. 21, 2021, which is incorporated herein in its entirety by reference.

FIELD OF THE DISCLOSURE

The present disclosure relates to an EV (Electric Vehicle) charging connector, a contact element arrangement for an EV connector, and a use of a heat pipe for cooling a contact element of a charging connector.

BACKGROUND OF THE INVENTION

Today, in charging connectors active cooling is used. Both, the cable and the contacts of an EV (Electric Vehicle) are cooled by tubes through which a fluid is pumped. The tubes are arranged inside the cable where the fluid is guided from a charging station to the connector and the contacts and back again to the charging station.

BRIEF SUMMARY OF THE INVENTION

The described embodiments pertain to a charging connector, a contact element arrangement for an EV connector, and use of a heat pipe for cooling a contact element of a charging connector. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to a first aspect, a contact element arrangement for an EV connector is provided. The contact element arrangement is configured to connect a charging wire to a connector interface on vehicle side and comprises a contact element and a heat pipe. The contact element comprises a base portion to which a charging wire is connected and a contact portion, which is the portion configured to get in contact with a counter contact element on vehicle side. The base portion is cooled by a fluid. The heat pipe extends from the contact portion to the base portion and is configured to carry heat from the contact portion to the base portion.

In other words, a heat pipe embedded in the contact element is utilized to enhance the heat transfer from the tip of the contacts towards the area cooled by liquid coolant. The heat pipe "extending from the contact portion to the base portion" means that the heat pipe is arranged contiguously at both portions. It is preferably arranged such that the most part of the heat pipe runs along the contact portion and a part of the heat pipe extends into the base portion. A heat pipe is a very effective heat conductor. The pipe is filled partly with a coolant, for example a fluid or water, which is evaporated in the portion near the heat source, i.e., the contact or contact element. The evaporated fluid transfers the heat towards the heat dissipation portion of the heat pipe, where the coolant is condensed. The coolant then flows back to the evaporator portion through gravity forces or through a capillary structure inside the pipe, such as a wick or a porous structure. The contact element arrangement may comprise several such heat pipes.

BRIEF DESCRIPTION OF THE SEVERAL VIEWS OF THE DRAWING(S)

DETAILED DESCRIPTION OF THE INVENTION

Corresponding parts are provided with the same reference symbols in all figures.

Figure 1:
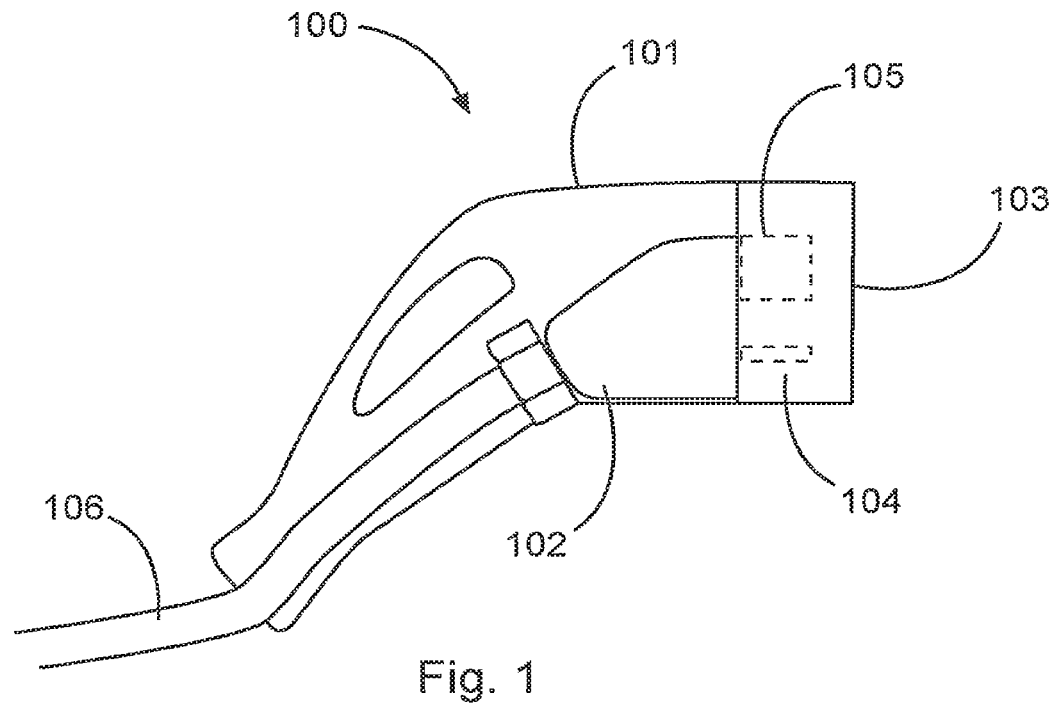
FIG. 1 is a diagram of a charging connector in accordance with the disclosure.

FIG. 1 shows a diagram of a charging connector 100. The connector 100 comprises an external housing 101 and an inner housing 102. The connector 100 receives a cable 106 on one side that runs through the connector 100 to the inner housing 102 to a mating interface 103. The cable 106 ends in the inner housing 102 at contact element 105 and further contacts 104. The contact element 105 and further contacts 104 extrude from the inner housing to the mating interface. When connected to a vehicle inlet, contact element 105 transfers the charging current from the charging lines in cable 106 to the contact element of the vehicle inlet. Besides wires for DC+, DC−, Neutral Line and signaling lines, the cable comprises tubes filled with coolant for cooling the wires and the contact elements 105.

Figure 2:
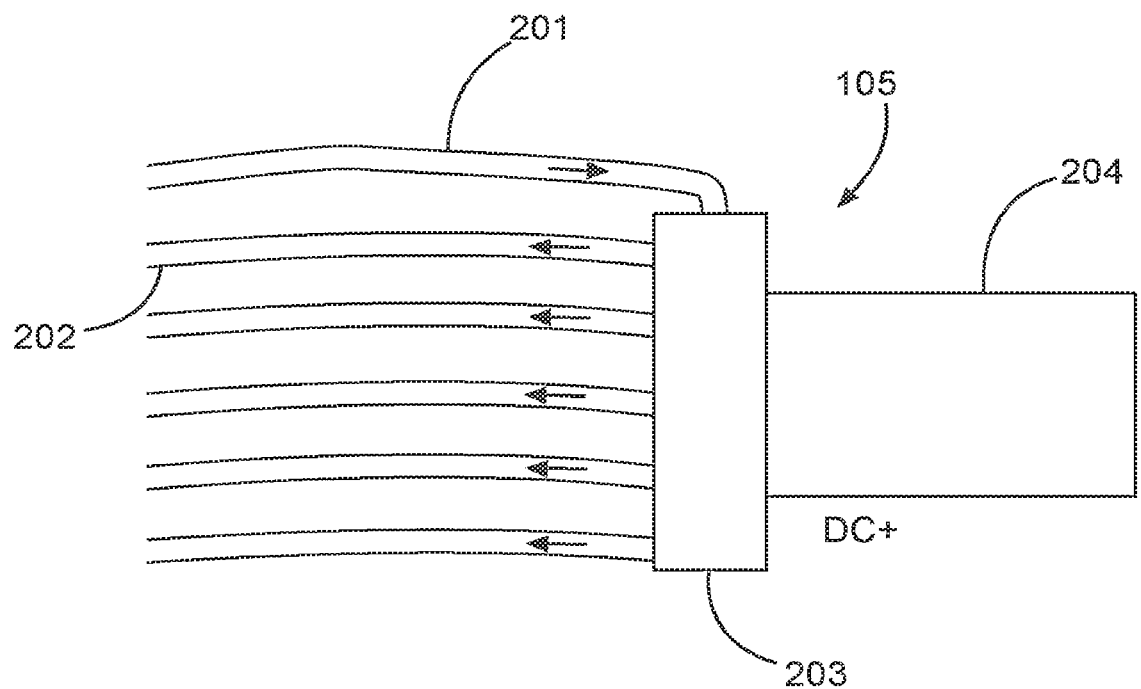
FIG. 2 is a diagram of a cooling mechanism for cooling a contact element, in accordance with the disclosure.

FIG. 2 shows a diagram of cooling mechanism for cooling the wires and especially the contact element 105 using tubes 201, 202 filled with a coolant. Tubes 201 carry the coolant originating from a charging station in a direction towards the contact element 105. Contact element 105 is composed of two parts 203, 204. One part 204, the contact part 204, has direct contact to its counter-part on vehicle side when the connector 100 is plugged into the vehicle. Thus, this part may be also be designated as hot part 204 or front part 204. The other part 203 may be designated as "base" 203 or base portion 203, on which the front part 204 is arranged on, or as "cool part" 203 because the coolant flows through this part 203. Although shown as two parts 203, 204, the contact element 105 may be one integral device. The base portion 203 has several outlets through which the coolant exits into the tubes 202 that carry the coolant back to the charging station. The number of outlets may be any number. For example, the number of outlets may be 3, 4 or 5.

Figure 3A:
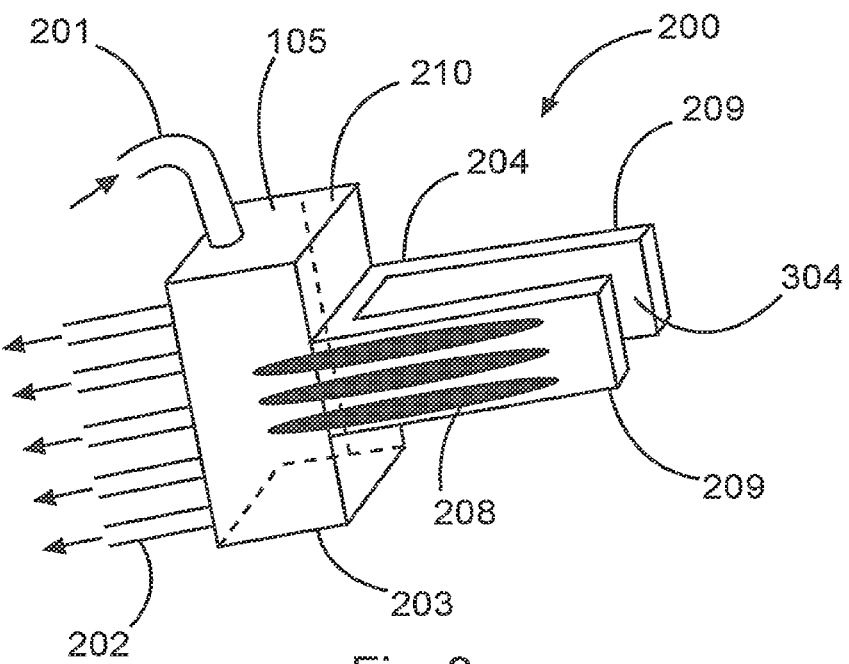
FIG. 3a is a 3D-diagram of a first example of the contact element arrangement in accordance with the disclosure.

FIG. 3a shows a 3D-diagram of a first example of the contact element arrangement 200. A contact element 105 is shown with base portion 203 being a bulky block and with U-shaped contact portion 204 comprising two elongated bodies 209 attached to it, which are also referred to as pins 209 or—in the shown example with the U-shaped contact portion—"arms" 209 of the U-shaped contact portion 204. The inner surface 304 of the elongated bodies 209 is where the contact occurs with the car inlet. The contact element 105 receives fresh coolant through tube 201, and it is attached to the wires of cable 106 carrying charging current. The coolant enters through the tube 201, which then transforms into a cavity 210 inside the contact element 105. Several heat pipes 208 are attached to the arms 209 of the U-shaped contact portion 204. Contact element 105 and the heat pipes 208 form the contact element arrangement 200.

Figure 3B:
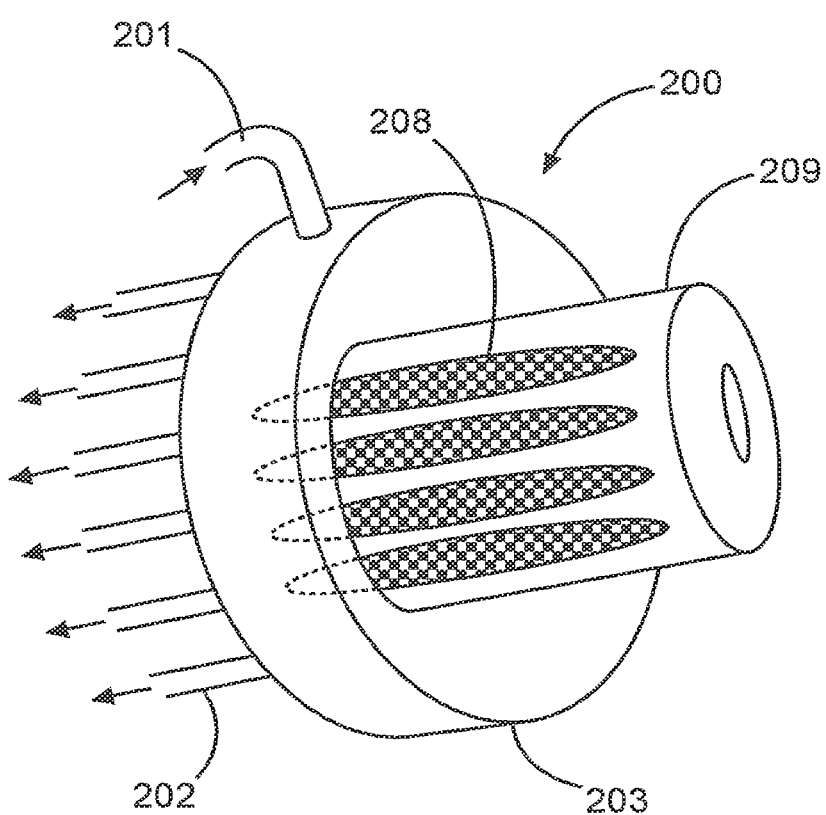
FIG. 3b is a 3D-diagram of a second example of the contact element arrangement in accordance with the disclosure.

FIG. 3b shows a 3D-diagram of a second example of the contact element arrangement 200, where the base portion 203 and the pins are round. The shape of the pin 209 may differ. E.g., it may be oval or have any other shape.

In this example, the heat pipes 208 may be mounted on the pins 209 or arranged inside the pins 209 and may protrude into the base portion 203. The square-pattern in FIG. 3b shall indicate that the heat pipes are inside the pins 209 and the base portion 203 and thus not visible from the outside and the dashed line illustrate the portions of the heat pipes 208 inside the base portion, Referring also to the previous figures, the pin 209 forms the contact portion 204, the contact portion 204 and the base portion 203 form the contact element 105, and the contact element 105 with the heat pipes 208 form the contact element arrangement 200.

Figure 4:
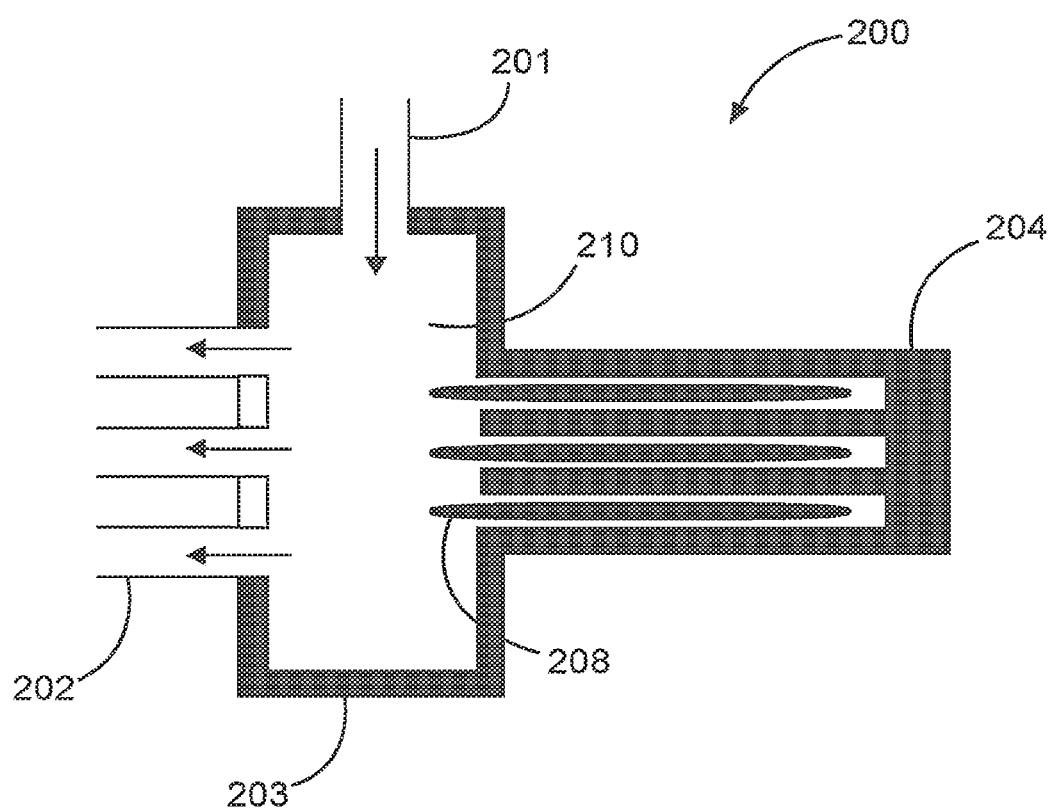
FIG. 4 is a diagram of the contact element arrangement with the contact element embodied as a cut, in accordance with the disclosure.

FIG. 4 shows a diagram of the contact element arrangement 200 with contact element 105 as a cut. The cavity 210 is reached by heat pipes 208 that connect the cavity 210 with the tip of the elongated bodies 209 or pins 209 of the contact portion 204 of contact element 105. That is, the heat pipes 208 are positioned within the bulk volume of the elongated bodies 209 and literally touch the coolant inside the cavity 210. Alternatively, or additionally, the heat pipes 208 are positioned on the external surface of the elongated bodies 209 as shown in FIGS. 3a and 3b, and do not touch the coolant directly.

Other variations to the disclosed embodiments can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

The contact element arrangement may be one of two contact elements, e.g. DC+(Direct Current) or DC−, in the connector that carry the charging current that is provided to a battery of an electric vehicle. It is thus the electric interface to a counter-interface of a vehicle to connect the charging wire coming from the charging station to a connector interface on vehicle-side.

Since the contact portion of the contact element is heated, which is mainly caused by the transition from the contact portion to the pin, there is a heat gradient from the contact portion to the base portion. A heat pipe having its evaporator at the connector portion and its condenser at the base can therefore effectively transport the heat from the contact portion to the base portion.

According to an embodiment, the base portion comprises a cavity with an inlet and an outlet for the fluid.

The base portion may be hollow and comprise a cavity such that it can be cooled by the fluid flowing through this cavity inside the base portion from an inlet at one side to an outlet at another side of the base. There may exist more than one inlet or outlet.

According to an embodiment, the contact portion comprises one or more contact pins.

The contact pins may have a round, an angular, a symmetrical or unsymmetrical shape. One contact element may have more than one pin. In this case, the pins are galvanically connected with each other. The pins may be arranged directly on the base portion, or, especially if they are more than one pin, the may be arranged on a base plate, and the base plate is arranged on the base portion. The pins and/or the base plate may be hollow or solid. In case that they are hollow, they may be define a common cavity with the cavity of the base portion.

According to an embodiment, the contact element is one integral part.

The contact element may be one integral part, which is also manufactured as such. However, the contact portion and the base portion may also be manufactured separately and put together, e.g., by molding, in a further step.

According to an embodiment, the heat pipe is arranged at the outer surface the contact element.

The heat pipe can be embedded on the outer surface of the contact element, i.e. the pins contact portion and a least a part of the base portion. In this case, the heat pipes could be brazed onto pockets in the pins. In case that the contact portion comprises a cavity, the cavity may extend into the pins, and the coolant may reach at least a part of these arms for supporting the cooling.

According to an embodiment, the heat pipe is arranged inside the contact element.

According to this embodiment, the heat pipe can be positioned internally in a hollow space of the pins and at least a part of the cavity of the base portion. That is, the heat pipe would be at least in the base portion in direct contact with the coolant flowing through the cavity. The heat pipe may be attached to the inner surface. Alternatively, the structure inside the pins may be such that the heat pipes can be embedded in the structure holding the heat pipes. For example, the pins are solid but having a recess into which the heat pipe may be embedded. In a further variation, this recess may be continued as hollow body protruding into the hollow chamber of the base portion, wherein the recess and hollow bodies adjoining the recess are sealed and form the heat pipe.

In this case, the two base portion and the contact portion of the contact element may be manufactured separately and assembled by welding.

According to an embodiment, the contact element arrangement comprises a further heat pipe, wherein one of the heat pipes is arranged on the outer surface contact element and the further heat pipe is arranged inside the contact element.

This is a combination of the previous embodiments resulting in very effective heat transfer.

According to an embodiment, the shape of the base portion is a cuboidal or cylindrical, and according to a further embodiment, the contact portion has a "U"-shaped cross-section.

Hereby, the "U"-shaped cross-section may have or may have not a rotational symmetry along the central axis of the "U".

The shape of the contact element thus may be defined by a block serving as base and a contact portion with U-shaped cross-section. In one embodiment, the bottom of the "U" is located at the base. The two arms of the "U" are flat and angular. The flat portions in-between the arms receive a flat counter-pin when plugging the connector into the charging socket or inlet of the vehicle. The flat shape provides surfaces that allow the arrangement of one or more heat pipes.

The arms may be flexible, such that they are pushed apart when plugging the connector into the charging socket and press against the pin. The shapes of the base portion and contact portion may vary as far as constraints defined by a standard, or other constraints allow modifications. For example, the base may be a cuboid or have a more complex geometrical shape. It may also have, e.g. partly, round portions.

In another embodiment, the U-shaped cross-section of the contact portion has rotational symmetry along its central axis, resulting in a hollow cylindrical shape.

The shape of the contact portion may be independent of the shape of the contact element.

According to a further aspect, a charging connector comprising a contact element arrangement as described herein is provided.

The charging connector may be, for example, a charging connector for medium voltage (MV) charging.

According to a further aspect, a use of a heat pipe for cooling a contact element of a charging connector is provided, wherein the contact element comprises a base portion to which a charging wire is connected and a contact portion, which is the portion configured to get in contact with a counter contact element on vehicle side. The base portion is cooled by a fluid, and the heat pipe extends from the contact portion to the base portion. The heat pipe is configured to carry heat from the contact portion to the base portion.

These and other features, aspects and advantages of the present invention will become better understood with reference to the accompanying figures and the following description.

REFERENCE NUMERALS 100 charging connector
101 external housing
102 inner housing
104 contact
105 contact element
106 charging cable
200 contact element arrangement
201 tube for inputting coolant
202 tube for outputting coolant
203 base portion
204 contact portion
208 heat pipe
209 pin/elongated body
210 cavity
304 inner surface of pin All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A contact element arrangement for an electric vehicle (EV) connector configured to connect a charging wire to a connector interface on vehicle-side, the arrangement comprising:
    a contact element; and
    a heat pipe;
    wherein the contact element comprises a base portion to which a charging wire is connected and a contact portion, the contact portion being configured to contact a counter contact element on a vehicle side;
    wherein the base portion is cooled by a fluid; and
    wherein the heat pipe extends contiguously from the contact portion to the base portion such that a majority of a length of the heat pipe runs along the contact portion and a minority of the length of the heat pipe extends into the base portion; and
    wherein the heat pipe is configured to carry heat from an extent of the contact portion to the base portion.

2. The contact element arrangement according to claim 1, wherein the base portion comprises a cavity with an inlet and an outlet for the fluid.

3. The contact element arrangement according to claim 2, wherein the heat pipe extends, at a first end, into the cavity and, at a second end, into the contact portion, and wherein the heat pipe comprises, at the first end, a condenser and, at the second end, an evaporator.

4. The contact element arrangement according to claim 1, wherein the contact portion comprises one or more contact pins.

5. The contact element arrangement according to claim 1, wherein the contact element is one integral part.

6. The contact element arrangement according to claim 1, wherein the heat pipe is arranged at an outer surface of the contact element.

7. The contact element arrangement according to claim 1, wherein the heat pipe is arranged inside the contact element.

8. The contact element arrangement according to claim 7, wherein the cavity comprises a reservoir for the fluid, and wherein the heat pipe is arranged inside the contact element such that the heat pipe is contained within the contact element.

9. The contact element arrangement according to claim 1, wherein the contact element arrangement comprises a further heat pipe; wherein one of the heat pipe or the further heat pipe is arranged on an outer surface of the contact element and the other of the heat pipe or the further heat pipe is arranged inside the contact element.

10. The contact element arrangement according to claim 1, wherein a shape of the base portion is cuboidal or cylindrical.

11. The contact element arrangement according to claim 1, wherein the contact portion has a "U"-shaped cross-section.

12. The contact element arrangement according to claim 1, wherein the extent extends away from the base portion.

13. A charging connector, comprising:
   a heat pipe in contact with a contact element, the heat pipe operating to cool the contact element of the charging connector;
   wherein the contact element comprises a base portion to which a charging wire is connected and a contact portion, the contact portion configured to contact a counter contact element on a vehicle side;
   wherein the base portion is cooled by a fluid; and
   wherein the heat pipe extends contiguously from the contact portion to the base portion such that a majority of a length of the heat pipe runs along the contact portion and a minority of the length of the heat pipe extends into the base portion; and
   wherein the heat pipe is configured to carry heat from an extent of the contact portion to the base portion.

* * * * *